(12) United States Patent
Bergstrom et al.

(10) Patent No.: US 9,259,729 B2
(45) Date of Patent: Feb. 16, 2016

(54) METHOD FOR PRODUCTION OF CHROMATOGRAPHY MEDIA

(75) Inventors: Jan Bergstrom, Balinge (SE); Bo-Lennart Johansson, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 435 days.

(21) Appl. No.: 13/642,937

(22) PCT Filed: Apr. 20, 2011

(86) PCT No.: PCT/SE2011/050481
§ 371 (c)(1),
(2), (4) Date: Oct. 23, 2012

(87) PCT Pub. No.: WO2011/136721
PCT Pub. Date: Nov. 3, 2011

(65) Prior Publication Data
US 2013/0040809 A1  Feb. 14, 2013

(30) Foreign Application Priority Data

Apr. 26, 2010 (SE) .................................... 1050407

(51) Int. Cl.
*B01J 39/16* (2006.01)
*B01J 47/00* (2006.01)
(Continued)

(52) U.S. Cl.
CPC .......... *B01J 39/165* (2013.01); *B01J 20/28004* (2013.01); *B01J 20/286* (2013.01); *B01J 20/3242* (2013.01); *B01J 20/3293* (2013.01); *B01J 47/007* (2013.01)

(58) Field of Classification Search
CPC .. B01J 39/165; B01J 47/007; B01J 20/28004; B01J 20/3242; B01J 20/3293; B01J 20/286
USPC .................... 210/635, 656, 659, 198.2, 502.1
See application file for complete search history.

(56) References Cited

U.S. PATENT DOCUMENTS 3,757,490 A    9/1973  Ma
6,572,766 B1 * 6/2003  Bergstrom et al. ........ 210/198.2
(Continued)

FOREIGN PATENT DOCUMENTS

EP           1 589 337      10/2005

OTHER PUBLICATIONS

Dewaele, C., et al., Journal of Chromatography, 260 (1983) 13-21.
(Continued)

*Primary Examiner* — Ernest G Therkorn
(74) *Attorney, Agent, or Firm* — Parks Wood LLC; Collen A. Beard, Esq.

(57) ABSTRACT

The present invention relates to a method and means to produce chromatography media having improved pressure-flow properties. More closely, the invention relates to bimodal particle size distribution and the use of layer functionalization as means to change pressure-flow properties of chromatography media. The invention relates to a method for production of chromatography media having improved pressure-flow properties, comprising mixing large beads/particles, comprising an inner core and an outer functionalized shell/lid, with smaller beads/particles, wherein the ratio of the particle size of large and small beads: [$D_{50V}$ for large particles/$D_{50V}$ for small particles]>1.2, and wherein the volume ratio of large and small beads in the column: [Total volume of large beads/Total volume beads] is in the range 0.05-0.9.

7 Claims, 4 Drawing Sheets

A shell functionalized with a strong IEX ligand (e.g. -SO₃⁻)

Non-functionalized core

(51) Int. Cl.
*B01J 20/286* (2006.01)
*B01J 20/32* (2006.01)
*B01J 20/28* (2006.01)

(56) References Cited

U.S. PATENT DOCUMENTS

| | | | |
|---|---|---|---|
| 7,309,426 B2 * | 12/2007 | Barber et al. | 210/198.2 |
| 7,846,337 B2 * | 12/2010 | Chen et al. | 210/656 |
| 2005/0236313 A1 * | 10/2005 | Barber et al. | 210/198.2 |
| 2007/0125711 A1 * | 6/2007 | Bergstrom et al. | 210/656 |
| 2007/0212540 A1 * | 9/2007 | Cheng et al. | 428/402 |
| 2009/0194481 A1 * | 8/2009 | Yilmaz et al. | 210/656 |
| 2010/0320149 A1 * | 12/2010 | Axen et al. | 210/656 |

OTHER PUBLICATIONS

Search Report Dated Jan. 6, 2014 Issued on Corresponding Chinese Patent Application No. 201180020915.3.

Mingard, Measurement Good Practice Guide No. 111, pp. 1-66.

* cited by examiner

METHOD FOR PRODUCTION OF CHROMATOGRAPHY MEDIA

CROSS-REFERENCE TO RELATED APPLICATIONS

This application is a filing under 35 U.S.C. 371 of international application number PCT/SE2011/050481, filed Apr. 20, 2011, published on Nov. 3, 2011 as WO 2011/136721, which claims priority to application number 1050407-4 filed in Sweden on Apr. 26, 2010.

FIELD OF THE INVENTION

The present invention relates to a method and means to produce chromatography media having improved pressure-flow properties. More closely, the invention relates to bimodal particle size distribution and the use of layer functionalisation as means to change pressure-flow properties of chromatography media

BACKGROUND OF THE INVENTION

The particle size and the rigidity of a chromatography media having the wanted binding capacity and efficiency does in some cases not allow high enough flow rates to be used in standard columns within their pressure specification. That may be the fact even for very rigid beads. It is well known that the pressure drop over packed beads decrease with increase in particle size. However, a change to media with larger size beads in order to reduce back pressures will result in lower resolution and lower dynamic binding capacities. Thus there is still a need in this field of alternative packed beads to reduce back pressures without sacrificing the chromatographic performance.

SUMMARY OF THE INVENTION

The present invention provides a simple method to decrease the flow resistance in a packed bed. This can be achieved by adding, such as 10-20%, of much larger shell particles to small particles with the same type of functionalization (ligand) in the shell as the small beads in order to decrease the flow resistance in the packed bed. The great advantage with this mix strategy is that the efficiency and the adsorption kinetics may be kept at a level close to that of the small particle. By using shell functionalized large particles an improved pressure flow characteristic is obtained without any loss in elution efficiency. The large shell beads can be a porous bead or designed with a nonporous core and a superficial porous stationary phase.

It is of course possible to use large bead that is not functionalized if the goal only is to reduce back-pressure in packed beds. The use of fully functionalized large beads will effect the resolution negatively. The loss of binding capacity at equilibrium will however be minimized. By using shell functionalized large beads instead the efficiency is preserved but the equilibrium binding capacity is reduced compared to fully functionalized large beads, however the dynamic binding capacity are in many cases the same at commonly used residence times. With the concept of mixed bead packed beads it is possible to optimize a column packing regarding back pressure and adsorption kinetics and with the use of shell functionalized large beads high elution efficiency (resolution) may be kept at the same level as for the small beads. This is important because high resolution will increase the possible sample load for a column of a certain size in polishing applications.

Thus, in a first aspect the invention relates to a method for production of chromatography media having improved pressure-flow properties, comprising mixing large beads/particles, comprising an outer functionalized shell/lid and an inner core, with smaller beads/particles, wherein the ratio of the particle size of large and small beads: [$D_{50V}$ for large particles/$D_{50V}$ for small particles]>1.2, preferably >3, and wherein the volume ratio of large and small beads in the column: [Total volume of large beads/Total volume of beads] is in the range 0.05-0.9.

$D_{50V}$ is the median particle size of the cumulative volume distribution.

The nature of the ligands is not limiting to the broad aspect of the present invention. Thus, in one embodiment of the present separation matrix, the ligands are selected from the group consisting of anion exchange ligands; cation exchange ligands; hydrophobic interaction chromatography (HIC) ligands; reversed phase chromatography (RPC) ligands; immobilised metal affinity chromatography (IMAC) ligands; thiophilic ligands; affinity ligands; nucleic acid-based ligands; ligands acting by pi-interactions, hydrogen bonds and/or Van der Waals forces; and multimodal ligands (sometimes denoted mixed mode chromatography ligands).

The ligands may be coupled directly to the support, or via extenders. The extender is conventional and may thus comprise linear, branched, cyclic saturated, unsaturated and aromatic groups (e.g. with up to 1-20, such as 1-10 carbon groups. These groups may comprise pure hydrocarbon groups, hydroxyl groups, alkoxy and aryloxo and the thio analogues and or amino groups. Carbon chains in hydrocarbon groups may at one or more positions be interrupted by nitrogen, ether oxygen and thioether sulphur. There may also be carbonyl groups, such as in amide and ketone groups and other groups having the comparable stability against hydrolysis. A surface extender functionalised outer part of the beads may be/function as the outer shell containing the interacting ligands.

The functionalized shell may have a porosity and pores of sizes that are both higher/larger and lower/smaller than that in the core ore the same.

The bead (base matrix) is based on organic and/or inorganic material.

The base matrix is in the case of bio-molecule applications preferably hydrophilic and in the form of a polymer, which is insoluble and more or less swellable in water. Hydrophobic polymers that have been derivatized to become hydrophilic are included in this definition. Suitable polymers are polyhydroxy polymers, e.g. based on polysaccharides, such as agarose, dextran, cellulose, starch, pullulan, etc. and completely synthetic polymers, such as polyacrylic amide, polymethacrylic amide, poly(hydroxyalkylvinyl ethers), poly(hydroxyalkylacrylates) and polymethacrylates (e.g. polyglycidylmethacrylate), polyvinylalcohols and polymers based on styrenes and divinylbenzenes, and copolymers in which two or more of the monomers corresponding to the above-mentioned polymers are included. Polymers, which are soluble in water, may be derivatized to become insoluble, e.g. by cross-linking and by coupling to an insoluble body via adsorption or covalent binding. Hydrophilic groups can be introduced on hydrophobic polymers (e.g. on copolymers of monovinyl and divinylbenzenes) by polymerization of monomers exhibiting groups which can be converted to OH, or by hydrophilization of the final polymer, e.g. by adsorption of suitable compounds, such as hydrophilic polymers.

Suitable inorganic materials to be used in base matrices are silica, zirconium oxide, graphite, tantalum oxide etc.

Different base matrix material in the small and large shell beads can be used.

More or less hydrophobic base matrixes may be used in chromatography applications where other molecules than bio-molecules are separated It is also possible to use both large and small shell activated beads in order to optimize resolution. 30 μm shell beads may be designed to have resolution very close to 10 μm beads. If one mix such beads with a 90 μm shell bead it will be possible to pack a polishing column with extraordinary chromatographic properties regarding resolution and pressure/flow properties.

According to the invention there is provided a method to increase the sample dynamic capacity for columns packed with large shell beads by replacing some of the large beads with small porous beads homogenously or shell functionalized with the same ligand as the large shell beads.

An advantageous aspect of the invention is to provide a method of preparing a high capacity, high efficient and low pressure flow separation packed chromatography column according to the invention, in which method a large shell bead is mixed with small porous beads substituted with ligands homogenous distributed throughout the beads.

The invention relates to a chromatography media comprising larger beads/particles, comprising a functionalized outer shell and an often non-functionalized porous or non-porous inner core. The core or inner part of the beads may also be functionalized. In this case the core ligand does not interact with the target molecules e.g. anion exchange ligands in the shell and cation exchange ligands in the core.

In a second aspect, the invention relates to a chromatography media comprising larger beads/particles, comprising an inner core and an outer shell, in mixture with smaller particles, wherein the ratio of the particle size of large and small beads: [$D_{50V}$ for large particles/$D_{50V}$ for small particles]>1.2, and wherein the volume ratio of large and small beads in the column: [Total volume of large beads/Total volume beads] is in the range 0.05-0.9.

DETAILED DESCRIPTION OF THE INVENTION

The invention will be described more closely in association with the accompanying drawings. The present examples are presented herein for illustrative purpose only, and should not be constructed to limit the invention as defined by the appended claims.

EXPERIMENTAL PART

Preparation of Shell Media Based on Sepharose 6 Fast Flow—Shell S 6FF

General

Volumes of matrix refer to settled bed volume and weights of matrix given in gram refer to suction dry weight. For reaction stirring is a motor-driven stirrer used since the use of magnet bar stirrer is prompt to damage the beads. Conventional methods were used for the analysis of the functionality and the determination of the degree of allylation, or the degree of ligand ($-SO_3^-$ groups) content on the beads.

Allyl Activation of Sepharose 6 Fast Flow with Allyl Glycidyl Ether

Sepharose 6 Fast Flow was washed with distilled water on a glass filter. 50 mL of drained Sepharose 6 Fast Flow is transferred to a reaction vessel and 25 mL of distilled water, 14.5 g of NaOH, 6.5 g of $Na_2SO_4$ and 1 g of $NaBH_4$ were added. After 0.5 h of stirring at 50° C., 70 mL of allyl glycidyl ether (AGE) was added. The reaction slurry is stirred at 50° C. for 18 h, followed by washings on a glass filter funnel with distilled water, ethanol and finally distilled water.

The allyl content was then determined by titration: 258 μmol/mL.

Shell Activation (3 μm Shell via Partial Bromination)

50 g of allylated drained gel, allylated Sepharose 6 Fast Flow (corresponding to a total of 12.9 mmol allyl groups) and 3 g sodium acetate was powerful stirred in 500 mL of distilled water. 0.2 equivalents of bromine (135 μL) were dissolved in 110 mL of distilled water in a well closed glass container. The bromine solution was added to the allyl gel slurry during vigorous stirring. After 5 minutes of stirring, the gel was washed on a glass filter with distilled water.

S-Lid Coupling 50 g of the partially brominated gel (see above) was transferred to a flask and mixed with 20 g of sodium sulphite dissolved in 40 mL distilled water. While stirring, 50% NaOH is added to pH 12.5, followed by stirring for 18 h at 50° C. and washings on a glass filter with distilled water. The gel was then washed with distilled water on a glass filter.

Core Allyl Removal 50 mL of S-shell gel (see above) was mixed with distilled water (50 mL) and 0.5 g sodium acetate in a beaker with overhead stirring. Bromine was added until the slurries had a remaining deeply orange/yellow colour. After 3 minutes of stirring, sodium formiate was added until the slurries were completely discoloured. The gels were then washed with distilled water on a glass filter and then stirred in 1M NaOH at 50° C. for 16-18 h, followed by washing with distilled water.

The $H^+$ capacity was then determined by titration: 49 μmol/mL.

Chromatographic Evaluation of Mixed Media (SP Sepharose HP and Shell S Sepharose 6 Fast Flow)

Materials and Method (General)

Figure 1:
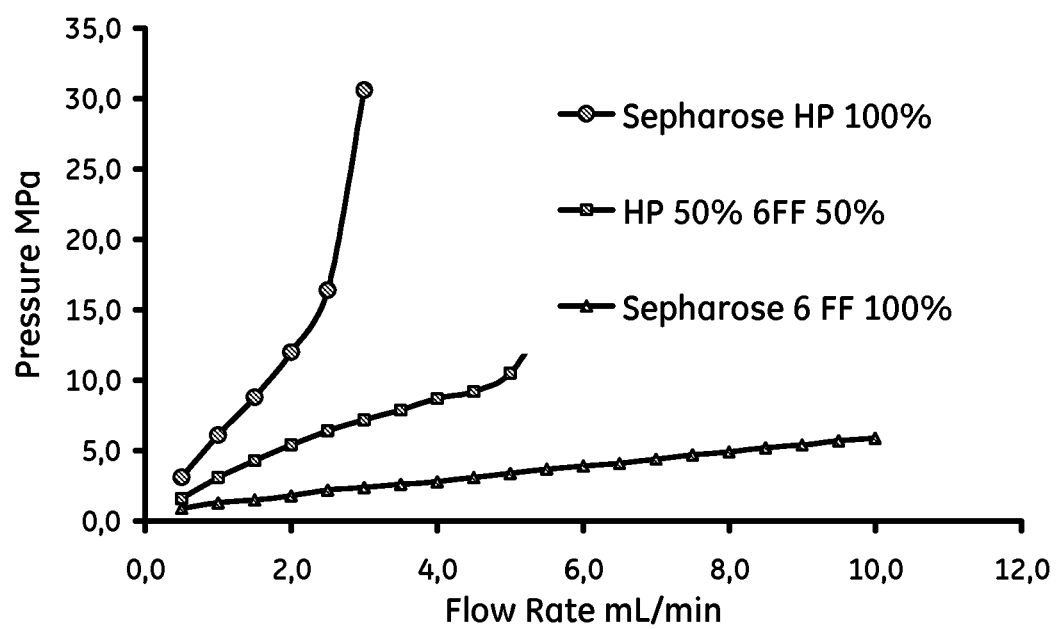
FIG. 1 is a graph of a chromatogram showing the influence of pressure drop over packed beads (column: Tricorn 5/50) packed with Sephaose HP, Sepharose 6 Fast Flow and a bead packed with a (50/50 v/v) mixture of these media.

To test the pressure/flow effect by mixing large and small beads Sepharose HP (mean particle size of 34 μm) was mixed with Sepharose Fast Flow (mean particle size of 90 μm) and packed in a column (Tricorn 5/50). The pressure/flow characteristics were compared with columns packed with Sepharose HP and Sepharose Fast Flow, respectively (FIG. 1).

Figure 2:
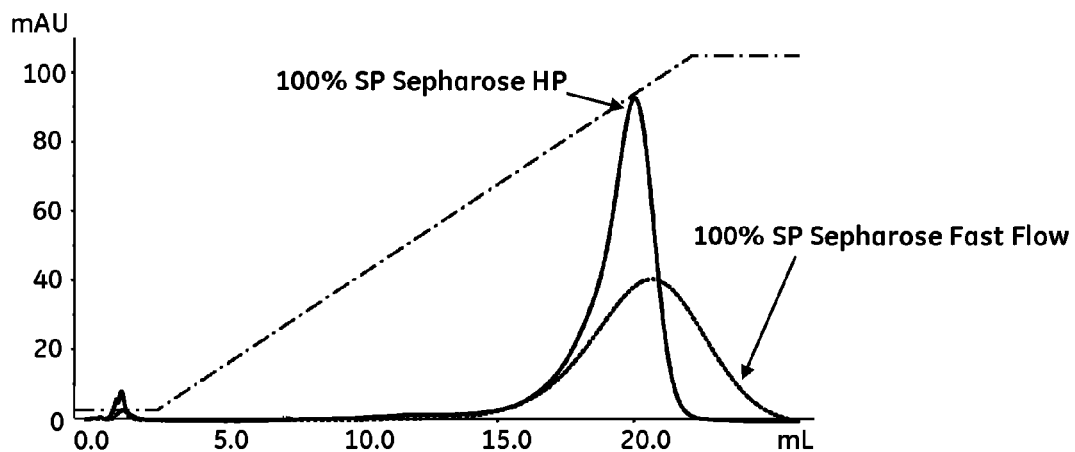
FIG. 2 is a graph of a chromatogram showing separation of lysozyme on SP Sepharose HP and SP Sepharose Fast Flow. Both media were packed in Tricorn 5/50 columns. The flow rate was 1.0 mL/min and the gradient 0-100% B within 20 minutes. Buffer A: 20 mM sodium acetate (pH 6.1). Buffer B: buffer A+0.20 M NaCl.
Figure 3:
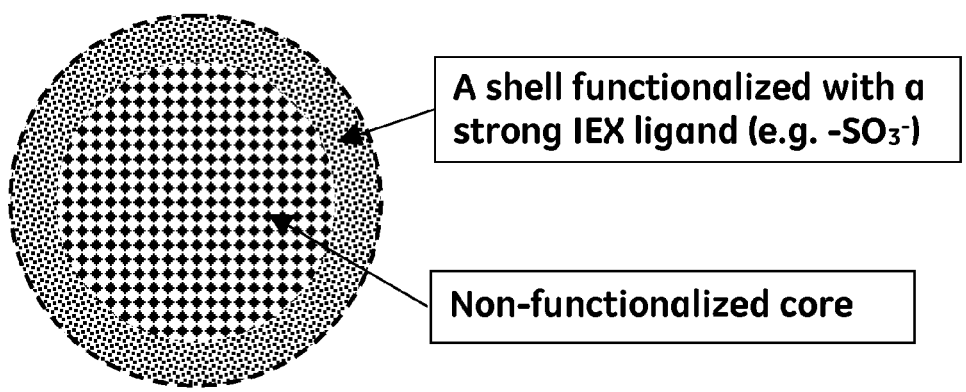
FIG. 3 is a schematic view of a shell bead according to the invention, called Shell S Sepharose Fast Flow.
Figure 4:
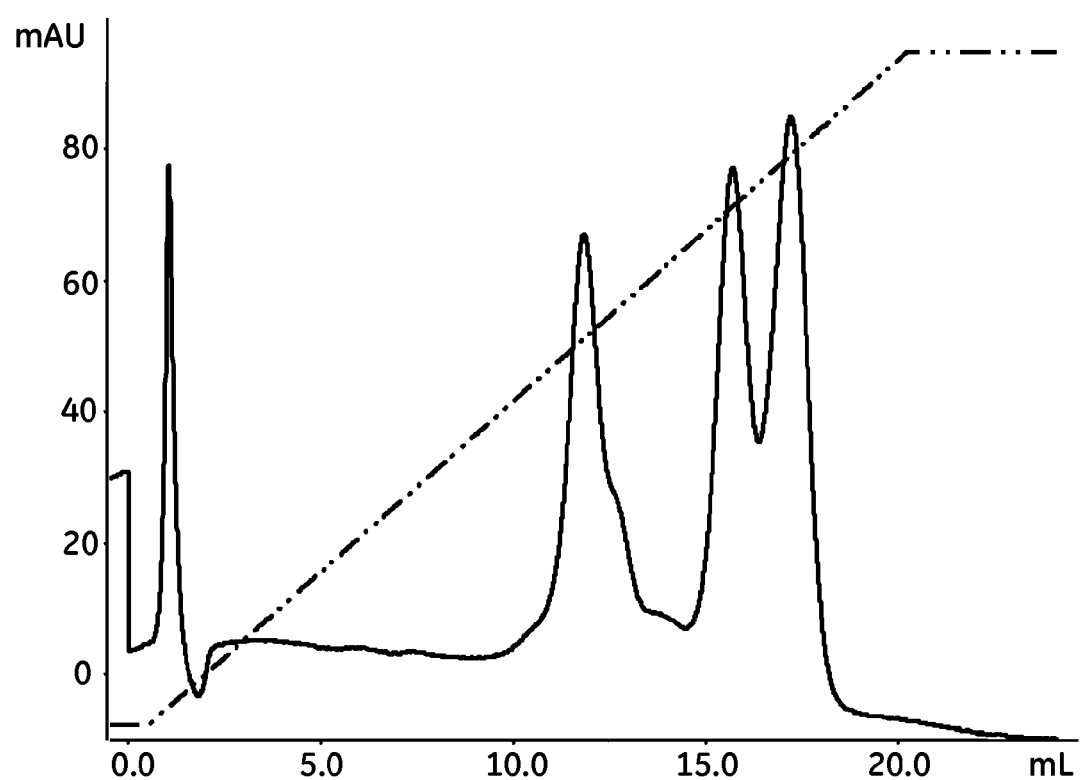
FIG. 4 is a graph of a chromatogram showing separation of ribonuclease A, cytochrome C and lysozyme on a Tricorn 5/50 packed with SP Sepharose HP. The flow rate was 1.0 mL/min and the gradient 0-100% B within 20 minutes. Buffer A: 20 mM sodium acetate (pH 5.8). Buffer B: buffer A+0.25 M NaCl.

The principle of the test method for separation of proteins is that proteins are injected into Tricorn 5/50 column, containing the separation medium/media, equilibrated with the A-buffer. Approximately 5 column volumes of A-buffer is then pumped through the column; then a 20-mL linear gradient from A-buffer to B-buffer (A-buffer+NaCl). The chromatographic profiles are then monitored at 280 nm. In FIGS. 2-4 are chromatographic results of SP Sepharose HP, SP Sepharose Fast Flow, and a mixture of SP Sepharose HP and Shell S Sepharose Fast Flow presented.

EXPERIMENTAL

The pressure flow characteristics were tested in a chromatography system, ÄKTAexplorer 100, with software UNICORN. The media to be investigated were packed in NextÄKTA 7/10 mm columns. As mobile phase was Milli-Q water used and an increasing linear flow rate (from 0 to 10 ml/min in 60 minutes) were applied through the column.

For evaluation of the chromatographic properties a number of different proteins were used. The media evaluated were packed in Tricorn 5/50 columns and the applied proteins were eluted with gradient elution (see above). Two different buffer systems were used:

1.
Buffer A: 100 mM acetate buffer (pH 5.8)
Buffer B: 100 mM acetate buffer (pH 5.8)+0.25 M NaCl
2.
Buffer A: 100 mM acetate buffer (pH 6.1)
Buffer B: 100 mM acetate buffer (pH 6.1)+0.20 M NaCl The samples used were ribonuclease A (1.5 mg/mL), cytochrome C (0.4 mg/mL) and lysozyme (0.4 mg/mL). The proteins were dissolved in the A-buffers and 200 μL were applied. Performance in a chromatographic system was monitored utilizing the equipment and settings presented below:

Apparatus (GE Healthcare Biosciences AB)
LC System: ÄKTA™ Explorer 10 XT
Software: UNICORN™
Injection loop: 200 μl
Column: Tricorn 5/50
Instrument Parameters
Flow rate: 1.0 mL/min
Detector cell: 10 mm
Wavelength: 280 nm
Results and Discussion This invention suggest a method for adjusting the pressure-flow properties of chromatographic media based on "small" beads by adding shell beads with larger particle size. It is well known that the pressure drop over beads packed in a column will be lower when the particle size increases. The back pressure for agarose particles with a mean particle size of 34 μm (Sepharose HP) and 90 mm (Sepharose Fast Flow), respectively, are presented in FIG. 1. This figure illustrate how the back pressure increases with the flow rate (see the Experimental section for details) and clearly show that large beads resulted in a much lower back pressure. The steep increase in back pressure notified for Sepharose HP is due to the small beads and also to compression of the beads at high flow rates. FIG. 1 also clearly shows that the back pressure is reduced when Sepharose Fast Flow beads are mixed with Sepharose HP beads. These results are expected. However, it is also well known that larger beads also results in a less efficient (broader peaks) columns. This phenomenon is illustrated in FIG. 2 with SP Sepharose HP (mean particle size of 34 μm) and SP Sepharose Fast Flow (mean particle size of 90 μm).

Figure 5:
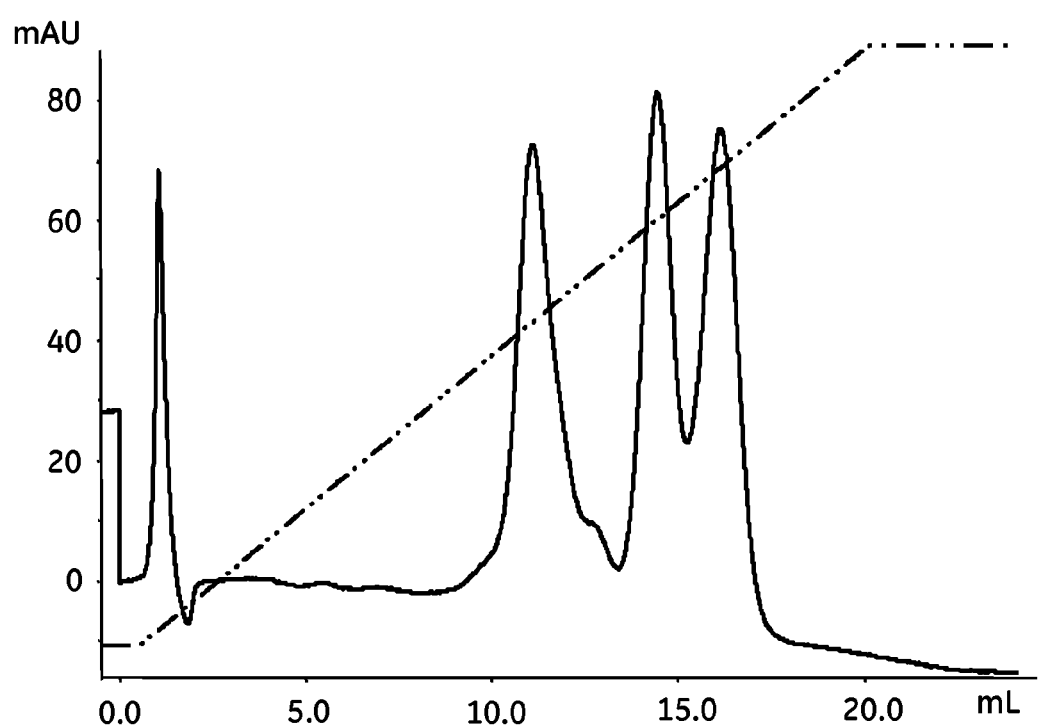
FIG. 5 is a graph of a chromatogram showing separation of ribonuclease A, cytochrome C and lysozyme on a Tricorn 5/50 packed with a 50/50 mixture of SP Sepharose HP and Shell S Sepharose Fast Flow. The flow rate was 1.0 mL/min and the gradient 0-100% B within 20 minutes. Buffer A: 20 mM sodium acetate (pH 5.8). Buffer B: buffer A+0.25 M NaCl.

This means that it is impossible to mix this type of beads with preserved efficiency as obtained for the small beads. We suggest mixing large shell beads with the same functionalization (the same ligand) as the small beads but the ligands are attached in a thin outer shell or an outer part that may be constituted of an immobilized surface extender (FIG. 3). This design of beads result in a faster mass transfer kinetics in the elution step and will therefore result in narrower peaks compared to beads of the same size homogeneous substituted with ligands as for SP Sepharose Fast Flow. If we compare FIG. 4 and FIG. 5 it is clearly demonstrated that this type of shell beads can be mixed with small homogenous ligand substituted beads without deterioration of the peak widths. In FIG. 4 is a chromatogram of three proteins separated on a column packed with SP Sepharose HP depicted and in FIG. 5 is the result from a column packed with a mixture of SP Sepharose HP and Shell S Sepharose Fast Flow shown.

The invention claimed is:

1. A method for production of chromatography media having improved pressure-flow properties, comprising mixing large beads/particles, comprising an inner core and an outer functionalized shell/lid, with smaller beads/particles, wherein the ratio of the particle size of large and small beads: [$D_{50V}$ for large particles/$D_{50V}$ for small particles]>3, and wherein the volume ratio of large and small beads in the column: [Total volume of large beads/Total volume beads] is in the range of from 0.1-0.2.

2. The method of claim 1, wherein the core is porous.

3. The method of claim 1, wherein the core is non-porous.

4. The method of claim 1, wherein the shell of the larger particles and the small particles are functionalized with the same type of ligand.

5. The method of claim 4, wherein the ligands are ion exchange ligands, HIC, Chelating, protein A, Affinity or RPC ligands.

6. The method of claim 1, wherein a porous core are functionalized with a ligand that not interact with the target molecule in a sample.

7. The method of claim 1, wherein the shell thickness (ST) of the large beads: ST<[$D_{50V}$ for small particles/2].

* * * * *